ns
Patented Nov. 13, 1962

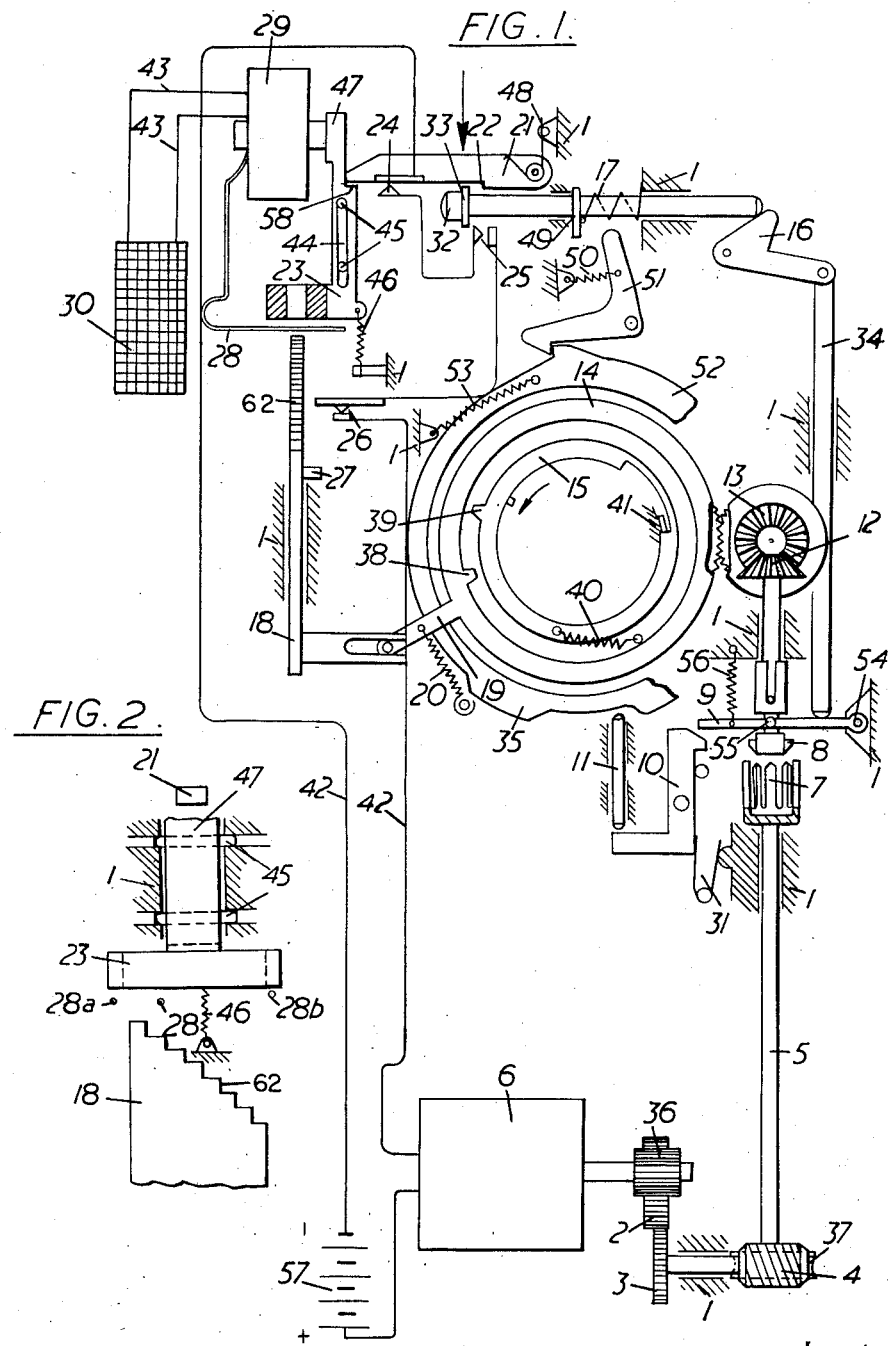

3,063,355
PHOTOGRAPHIC CAMERAS
Klaus Hintze, Dresden, Germany, assignors to VEB Kamera-und Kinowerke Dresden, Dresden, Germany
Filed Sept. 16, 1960, Ser. No. 56,575
7 Claims. (Cl. 95—10)

The present invention relates to a photographic camera with setting members for exposure factors such as diaphragm and exposure time, controlled by an exposure meter, a release which frees the shutter drive mechanism being blocked in dependence upon the position of the pointer of the exposure meter.

In order to avoid the observation of warning marks indicating inadequate light conditions, a blocking device for the release has already become known which is formed by the pointer of an exposure meter, the pointer having to prevent the requisite release stroke. However, the small dimensions of the pointer cross-section, selected in view of the lightest possible construction of the pointer, are not sufficient for preventing the release stroke. Apart from this, the known blocking device as a result of the release pressure acting upon the pointer inclines to damage to the pointer. Furthermore, from this known device no means may be seen which, despite return of the pointer into its rest position, maintain the settings of the exposure factors during the running-off of the shutter mechanism, until termination of the exposure operation.

The aim of the invention is the avoidance of the stated disadvantages by the provision of a novel exposure control device, which in the case of inadequate light conditions blocks the release and maintains the settings of the exposure factors until termination of the exposure operation.

In accordance with the invention this is achieved due to the fact that a support rail which catches the pointer on meeting of a setting slider is preferably arranged for movement against a return spring and is in engagement with a locking lever which blocks the release. The galvanometer is preferably arranged on one arm of the support rail. In the case for example of a setting slider driven by an electric motor the locking lever is expediently constructed as a contact which lies in the current circuit of the electric motor which moves the setting slider against the pointer and is to be set in operation by the release. In order to prevent the running-off of the shutter mechanism in the case of the position of the pointer which does not permit a proper exposure, the setting slider possesses a dog which actuates an interrupter disposed in the current circuit of the electric motor.

The gear connection between the electric motor and the setting slider is expediently constituted by a coupling actuated by the release, which is arrested in the coupling position by a locking pawl, until termination of the exposure operation, so that the set values of the exposure factors are maintained during the entire operation. The details of the invention may be seen from an illustrated and described example of embodiment.

FIGURE 1 shows the diagrammatic construction of the setting mechanism controlled by the exposure meter; and FIGURE 2 shows the setting slider with the movable support rail.

In a camera housing 1 (not specially illustrated) there is arranged the motor 6 driven by a current source 57, the drive pinion 36 of which motor rotates the toothed wheel 3 connected with the worm 4, through an intermediate wheel 2. The worm 4 is in engagement with the worm wheel 37. With the worm wheel 37 there is connected through the shaft 5 the crown wheel 7, opposite to which the claw 8 is arranged in axially movable fashion. This claw 8 is positively connected, in the direction of rotation, with the bevel wheel 12, which in turn meshes with the bevel wheel 13. The bevel wheel 13 is in engagement with the toothed diaphragm setting ring 14. With the diaphragm setting ring 14 there is associated the arm 19, on which a return spring 20 is secured. This arm 19 is in gear connection with the setting slider 18. Furthermore, the diaphragm setting ring 14 possesses the nose 38, in the path of which there lies the nose 39 of the exposure time setting ring 15. On the exposure time setting ring 15 there is secured the return spring 40, which seeks to draw the exposure time setting ring 15 against the stop 41 fast with the housing.

The step-shaped setting slider 18 carries the dog 27, in the path of which there is arranged an interrupter 26 lying in the current circuit 42. Opposite the edge 62 of step-shaped construction (see especially FIGURE 2) there swings the pointer 28 of the galvanometer 29, which is connected through the lead 43 with the photo-electric cell 30.

For catching the pointer 28 there is provided the support rail 23, the slot 44 of which is guided on pins 45. On the support rail 23 there is secured the return spring 46. On the arm 47 of the support rail 23 there is arranged the galvanometer 29. By rotation of a part or of the whole galvanometer the film sensitivity for example can be taken into consideration. In the path of the edge 58 of the arm 47 there lies the locking lever 21, which the spring 48 seeks to keep in contact with the contact 24. The locking lever 21 possesses the projection 22, which lies in the path of the collar 33 of the release 32. In the path of the collar 33 there further lies the switch 25. The release 32 can be pressed down against the action of the spring 17.

In the path of the projection 49 of the release 32 there is arranged the catch lever 51 drawn by the spring 50 against the shutter drive ring 52 which lever holds the said shutter drive ring 52 against the drive spring 53. The release 32 is further connected through the bell-crank lever 16 and the rod 34 with the arm 9. This arm 9 is rotatable about the spindle 54 and articulatedly connected through the pin 55 with the claw 8. The spring 56 seeks to hold the claw 8 out of engagement with the crown wheel 7. The locking pawl 10 pivoted by the spring 31 into the path of the arm 9 is actuated by the push-rod 11, which is shifted by the dog 35, towards the end of the running-off movement of the shutter drive ring 54.

The manner of operation of the device is as follows:

On depression of the release 32 until the collar 33 contacts the projection 22, firstly the collar 33 by actuation of the switch 25 closes the current circuit 42, so that the motor 6 is set in operation. At the same time the release 32, through the bell-crank lever 16 and the rod 34, has brought the claw 8 into engagement with the crown wheel 7, without the locking pawl 10 falling behind the arm 9. Thus the motor is in a position to rotate the setting ring 14 in the clockwise direction, through the coupling 7, 8, which takes place against the action of the spring 20. Here firstly, the diaphragm aperture is enlarged. When the maximum diaphragm aperture is reached, the nose 38 of the diaphragm setting ring 14 strikes upon the nose 39 of the exposure time setting ring 15, so that now with maintenance of the maximum diaphragm aperture the exposure times are extended. At the same time, the setting slider 18 is moved towards the pointer 28, until the step-shaped edge 42 presses the pointer 28 against the support rail 23 and in doing so moves the edge 58 of the arm 47 against the locking lever 21. Consequently, the locking lever 21 is rotated in the clockwise direction so that, on the one hand, the switch formed by the locking lever 21 and the contact 24 is opened and, on the other hand, the projection 22 is pivoted out of the path of the collar 33. The galvanometer mounted on the arm 47 is also shifted, so that no deformation of the pointer 28 occurs. The release 32 can be moved further, after pivoting away of the locking lever 21, and through the bell-crank lever 16 and the rod 34 can rotate the arm 9 further in the counter-clockwise direction, so that the locking pawl 10 drops behind the arm 9. Thereupon the projection 49 pivots the catch lever 51 against the spring 50 and causes it to release the shutter drive ring 52. Towards the end of the running-off movement of the shutter drive ring 52 the dog 35 strikes upon the push-rod 11 and rotates the locking pawl 10, so that under the action of the spring 56 the arm 9 can disengage the claw 8 from the crown wheel 7.

In the case of a brightness which is not adequate for a proper exposure, the pointer 28 is situated in a position 28a or 28b, in which the pointer 28 is not met by the setting slider 18. The setting slider 18 consequently runs off without pressing the pointer 28 against the support rail 23. Then the dog 27 of the setting slider 18 strikes upon the interrupter 26, whereby the current circuit 42 is opened, and the electric motor 6 is switched off. In this case the locking lever 21 is not pivoted and the release 32 remains blocked.

Apart from the example of embodiment as illustrated the ring 14 can also be constructed as control ring, which controls the setting members for diaphragm and exposure time according to a predetermined program.

I claim:

1. In a camera having a housing and a diaphragm setting ring rotatably mounted in the housing; the provision of an arm slidably mounted in the housing, an exposure meter mounted on said arm, an exposure meter pointer pivotally mounted on said exposure meter, a setting slider drivably connected to the diaphragm setting ring and slidably mounted in the housing and having a width corresponding to the useful range of pivotal movement of said pointer, a support bar formed on the arm and having an aperture through which the setting slider can pass, picture-taking release means mounted in the housing, releasable locking means mounted in the housing, a collar formed on the picture-taking release means which collar is engaged by the releasable locking means to lock releasably said picture-taking release means, and drive means for rotating said diaphragm setting ring, wherein depression of the picture-taking release means causes said drive means to rotate the diaphragm setting ring thereby sliding the setting slider toward the arm and entraining the pointer against the support bar if the pointer is within its useful range of pivotal movement, thus causing movement of the arm which releases the releasable locking means and allows further depression of the picture-taking release means to effect picture-taking.

2. In a camera having a housing and a diaphragm setting ring rotatably mounted in the housing; the provision of an arm slidably mounted in the housing, an exposure meter mounted on said arm, an exposure meter pointer pivotally mounted on said exposure meter, a setting slider drivably connected to the diaphragm setting ring and slidably mounted in the housing and having a width corresponding to the useful range of pivotal movement of said pointer, a support bar formed on the arm and having an aperture through which the setting slider can pass, picture-taking release means mounted in the housing, releasable locking means mounted in the housing, a collar formed on the picture-taking release means which collar is engaged by the releasable locking means to lock releasably said picture-taking release means, drive means for rotating said diaphragm setting ring and cut-out means operable by the setting slider for stopping said drive means, wherein depression of the picture-taking release means causes said drive means to rotate the diaphragm setting ring thereby sliding the setting slider toward the arm and entraining the pointer against the support bar if the pointer is within its useful range of pivotal movement, thus causing movement of the arm which releases the releasable locking means and allows further depression of the picture-taking release means to effect picture-taking and wherein depression of the picture-taking release means causes said drive means to rotate the diaphragm setting ring thereby sliding the setting slider toward the arm and into said aperture of the support bar if the pointer is outside its range of pivotal movement, the setting slider then operating the cut-out means to stop the drive means, the releasable locking means remaining in engagement with the collar of the picture taking release means thus preventing further depression of said release means and preventing picture taking.

3. In a camera having a housing and a diaphragm setting ring rotatably mounted in the housing; the provision of an arm slidably mounted in the housing, an exposure meter mounted on said arm, an exposure meter pointer pivotally mounted on said exposure meter, a setting slider drivably connected to the diaphragm setting ring and slidably mounted in the housing and having a width corresponding to the useful range of pivotal movement of said pointer, a support bar formed on the arm and having an aperture through which the setting slider can pass, picture-taking release means mounted in the housing, releasable locking means mounted in the housing, a collar formed on the picture-taking release means which collar is engaged by the releasable locking means to lock releasably said picture-taking release means, drive means including an electric motor for rotating said diaphragm setting ring and an electric contact mounted on said locking means and arranged in the circuit of said electric motor, wherein depression of the picture-taking release means energises the electric motor which drives the diaphragm setting ring thereby sliding the setting slider toward the arm and entraining the pointer against the support bar if the pointer is within its useful range of pivotal movement, thus causing movement of the arm which releases the releasable locking means thereby opening said contact to de-energise the electric motor and stop the drive means and to allow further depression of the picture-taking release means to effect picture-taking.

4. In a camera having a housing and a diaphragm setting ring rotatably mounted in the housing; the provision of an arm slidably mounted in the housing, an exposure meter mounted on said arm, an exposure meter pointer pivotally mounted on said exposure meter, a setting slider drivably connected to the diaphragm setting ring and slidably mounted in the housing and having a width corresponding to the useful range of pivotal movement of said pointer, a support bar formed on the arm and having an aperture through which the setting slider can pass, picture-taking release means mounted in the housing, releasable locking means mounted in the housing, a collar formed on the picture-taking release means which collar is engaged by the releasable locking means to lock releasably said picture-taking release means, drive means including an electric motor for rotating said diaphragm setting ring and an interrupter arranged in the circuit of the electric motor and operable by the setting slider for stopping said electric motor, wherein depression of the picture-taking release means causes said drive means to rotate the diaphragm setting ring thereby sliding the setting slider toward the arm and entraining the pointer against the support bar if the pointer is within its useful range of pivotal movement, thus causing movement of the arm which releases the releasable locking means and allows further depression of the picture-taking release means to effect picture-taking, and wherein depression of the picture taking release means causes said drive means to rotate the diaphragm setting ring thereby sliding the setting slider toward the arm and into said aperture of the support bar if the pointer is outside its range of pivotal movement, the setting slider then operating the interrupter to stop the electric motor, the releasable locking means remaining in engagement with the collar of the picture taking release means thus preventing further depression of said release means and preventing picture taking.

5. In a camera having a housing and a diaphragm setting ring rotatably mounted in the housing; the provision of an arm slidably mounted in the housing, an exposure meter mounted on said arm, an exposure meter pointer pivotally mounted on said exposure meter, a setting slider drivably connected to the diaphragm setting ring and slidably mounted in the housing and having a width corresponding to the useful range of pivotal movement of said pointer, a support bar formed on the arm and having an aperture through which the setting slider can pass, picture-taking release means mounted in the housing, releasable locking means mounted in the housing, a collar formed on the picture-taking release means which collar is engaged by the releasable locking means to lock releasably said picture-taking release means, an electric motor mounted in the housing and a detachable coupling arranged to connect drivably said electric motor to the diaphragm setting ring for rotating said diaphragm setting ring, wherein depression of the picture-taking release means causes the coupling to connect drivably the electric motor to the diaphragm setting-ring and causes the electric motor to be energised to rotate the diaphragm setting ring thereby sliding the setting slider toward the arm and entraining the pointer against the support bar if the pointer is within its useful range of pivotal movement, thus causing movement of the arm which releases the releasable locking means and allows further depression of the picture-taking release means to effect picture-taking.

6. In a camera having a housing and a diaphragm setting ring rotatably mounted in the housing; the provision of an arm slidably mounted in the housing, an exposure meter mounted on said arm, an exposure meter pointer pivotally mounted on said exposure meter, a setting slider drivably connected to the diaphragm setting ring and slidably mounted in the housing and having a width corresponding to the useful range of pivotal movement of said pointer, a support bar formed on the arm and having an aperture through which the setting slider can pass, picture-taking release means mounted in the housing, releasable locking means mounted in the housing, a collar formed on the picture-taking release means which collar is engaged by the releasable locking means to lock releasably said picture-taking release means, drive means for rotating said diaphragm setting ring and a locking device for locking the diaphragm setting ring in any position, wherein depression of the picture-taking release means causes said drive means to rotate the diaphragm setting ring thereby sliding the setting slider toward the arm and entraining the pointer against the support bar if the pointer is within its useful range of pivotal movement, thus causing movement of the arm which releases the releasable locking means and allows further depression of the picture-taking release means to operate said locking device and lock the diaphragm setting ring in the set position and to effect picture-taking.

7. In a camera having a housing and a diaphragm setting ring rotatably mounted in the housing; the provision of an arm slidably mounted in the housing, an exposure meter mounted on said arm, an exposure meter pointer pivotally mounted on said exposure meter, a setting slider drivably connected to the diaphragm setting ring and slidably mounted in the housing and having a width corresponding to the useful range of pivotal movement of said pointer, a support bar formed on the arm and having an aperture through which the setting slider can pass, picture-taking release means mounted in the housing, releasable locking means mounted in the housing, a collar formed on the picture-taking release means which collar is engaged by the releasable locking means to lock releasably said picture-taking release means, drive means for rotating said diaphragm setting ring and a locking device for locking the diaphragm setting ring in any position, wherein depression of the picture-taking release means causes said drive means to rotate the diaphragm setting ring thereby sliding the setting slider toward the arm and entraining the pointer against the support bar if the pointer is within its useful range of pivotal movement thus causing movement of the arm which releases the releasable locking means and allows further depression of the picture-taking release means to operate said locking device and lock the diaphragm setting ring in the set position and to effect picture-taking, said locking device being released on completion of the picture-taking operation.

References Cited in the file of this patent

UNITED STATES PATENTS

| | | |
|---|---|---|
| 2,780,971 | Fahlenberg | Feb. 12, 1957 |
| 2,931,282 | Owens | Apr. 5, 1960 |
| 2,943,545 | Fahlenberg | July 5, 1960 |